United States Patent [19]

Suzuki et al.

[11] 4,141,001
[45] Feb. 20, 1979

[54] MONITOR DISPLAY CONTROL METHOD AND APPARATUS FOR DATA INPUT UNIT

[75] Inventors: Koichi Suzuki, Kawasaki; Kenji Yoichizono, Mitaka; Tsutomu Matsumoto, Chigasaki; Hiroshi Asami, Inagi, all of Japan

[73] Assignee: Fujitsu Limited, Japan

[21] Appl. No.: 769,688

[22] Filed: Feb. 17, 1977

Related U.S. Application Data

[63] Continuation of Ser. No. 536,579, Dec. 26, 1974, abandoned.

[30] Foreign Application Priority Data

Dec. 30, 1973 [JP] Japan .................................. 49/1583

[51] Int. Cl.² .............................................. G06F 3/14
[52] U.S. Cl. ................................ 340/711; 340/365 R
[58] Field of Search ........ 340/324 R, 324 A, 324 AD, 340/365 R, 147 R, 147 P

[56] References Cited

U.S. PATENT DOCUMENTS 3,187,321  6/1965  Kameny ........................ 340/365 R
3,505,665  4/1970  Lasoff et al. ..................... 340/324 A Primary Examiner—Marshall M. Curtis
Attorney, Agent, or Firm—Staas & Halsey

[57] ABSTRACT

A data input unit has a monitor display unit with a display screen and a manual input device such as a keyboard. Plural transaction items for at least one transaction type are displayed selectively on one portion of the display screen. A second portion of the screen provides for display of manually entered data corresponding to each item. When data which corresponds to a predetermined item displayed on the screen of the monitor display unit is supplied as an input by said manual input devices, said input data is displayed initially in a prearranged common display area comprising a third portion of the screen of the monitor display unit. After an operator confirms the accuracy of the displayed data, and actuation of an item select key causes the data displayed on the common display area to be transferred and displayed on the second portion of the screen in a position directly relating that data to its corresponding transaction item.

10 Claims, 13 Drawing Figures

FIG.4a

ACCOUNT NUMBER [1] - 6
DATE [3] - 10
AMOUNT [2] - 5
BANK NUMBER [7] - 2
BRANCH NUMBER [8] - 2

ACCOUNT NUMBER [1] - 6
DATE [3] - 10
AMOUNT [2] - 5
BANK NUMBER [7] - 2
BRANCH NUMBER [8] - 2

ACCOUNT NUMBER [1] - 6
DATE [3] - 10
AMOUNT [2] - 5
BANK NUMBER [7] - 2
BRANCH NUMBER [8] - 2

ACCOUNT NUMBER [1] - 6
DATE [3] - 10
AMOUNT [2] - 5
BANK NUMBER [7] - 2
BRANCH NUMBER [8] - 2

123456
1974-01-01

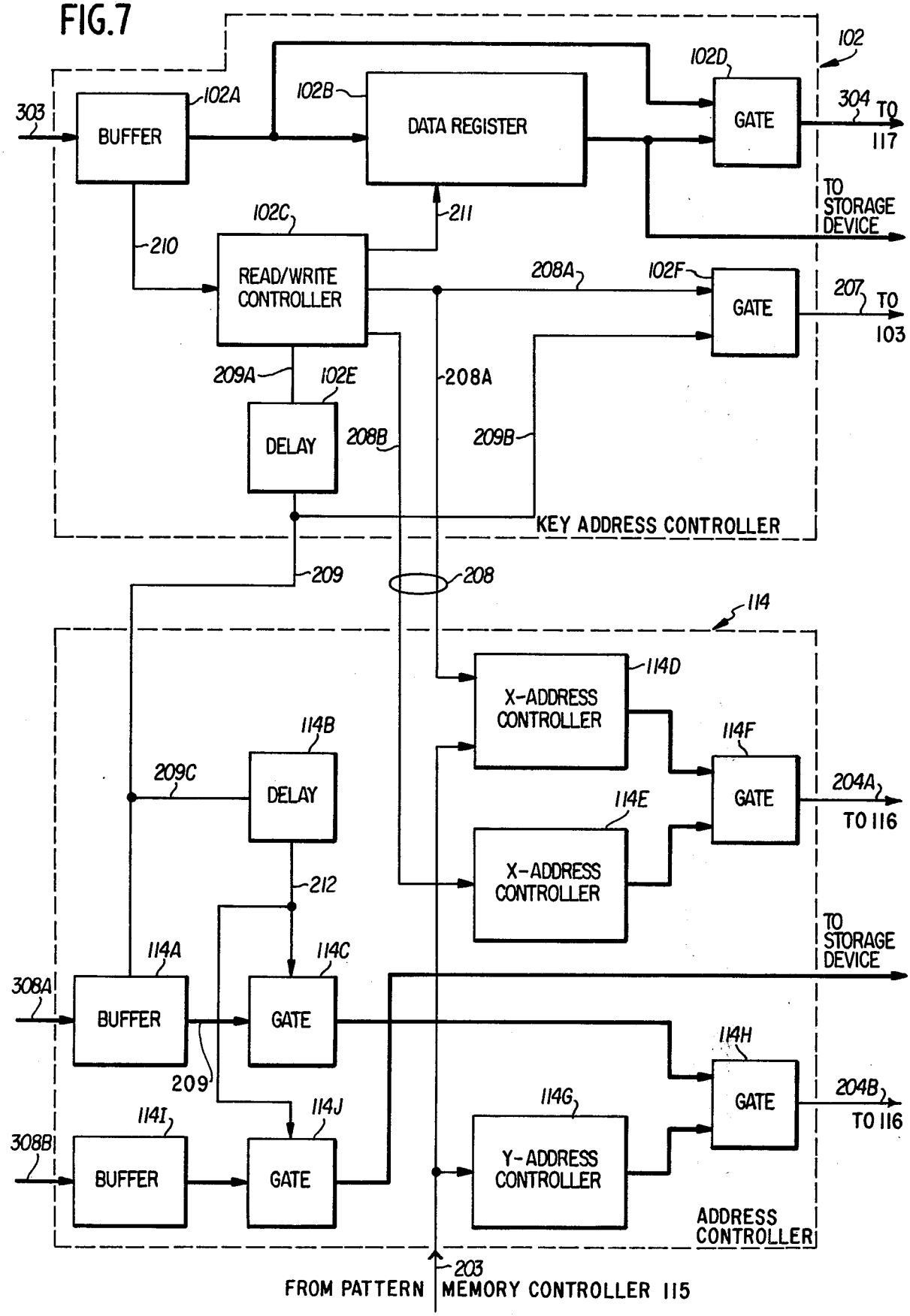

MONITOR DISPLAY CONTROL METHOD AND APPARATUS FOR DATA INPUT UNIT

This is a continuation of application Ser. No. 536,579 filed Dec. 26, 1974 now abandoned.

BACKGROUND OF THE INVENTION

1. Field of the Invention

This invention relates to monitor display control method and apparatus for a data input unit and more particularly to monitor display control method and apparatus for a data input unit which is improved in order to make operator's work easier.

2. Description of the Prior Art

The method to input data into an unit by means of manual input device, such as a keyboard is in wide use, and the display of the data on the screen of a monitor display unit is generally used in order to confirm the manually input data. Data input units having such monitor display units are widely adopted in electronic table calculators, in data entry devices such as key to disk (or key to cassette) devices, and in data terminal equipment which is connected to computers. Monitor display units in a data input unit are very useful in the case of manual input of many types of data at one time.

For example, subscription service and banking service adopt the system wherein the data which correspond to respective predetermined items are manually input.

In these cases, monitor display units e.g., cathode ray tubes, are used to display each of plural items and the data relating to each such item in prearranged, plural rows of the monitor display respectively corresponding to those items. Operators, after checking the displayed items, input the data which correspond to respective items by the use of manual input devices such as digit or data keys, and then the manually input is displayed data in the row position of the display for the corresponding items so that the operators can check that manual input data are correctly input and correctly correspond to respective items.

As an example, in banking service, customer's transaction data of various kinds are represented, e.g., as the first item "account number", the second item "balance", the third item "date", the fourth item "amount", and the fifth item "bank number" on respective positions of the first, second, third, fourth, and fifth rows of the display screen of a monitor display unit. An operator successively inputs the transaction data corresponding to respective items of customers by pressing the alphabetic keys and digit, or numeric keys. A data input unit having such conventional monitor display unit is characterized by the following operator's work: checking of the aforesaid display items, pressing of the item select keys corresponding to respective items, and manual inputting of the data by a device such as numeric keys in order to display the manually input data concerned on the positions of the same rows where the respectively corresponding items are displayed. As a result, this data input unit provides operator's visual check of the validity of the data.

However, this well-known monitor display control method for a data input unit has a disadvantage, that is, the display of many items at one time makes the following check difficult because these data are directly represented on the position of the row where the corresponding items are displayed: check of the positions where input data are represented, and check of the items which correspond to the input data. This problem is especially difficult in the case of manual data input of items at operator's option instead of the case of manual data input in the order of the position of displayed items on the screen.

OBJECT OF THE INVENTION

An object of the invention is to provide a monitor display control method and apparatus, or system, which is improved in order to lighten a burden of an operator who controls a data input unit having a monitor display control device operative in the manner described.

Another object of the invention is to provide a monitor display control method and apparatus which allows easy check of manually input data for a data input unit.

Another object of the invention is to provide a monitor display control method and apparatus which allows all manual input data to be displayed in a prearranged row of a display screen.

A further object of the invention is to provide a monitor and display control system and method of operation thereof which provides for initial display of manually input data in a common display area for accuracy checking by the operator, and subsequent transfer of the checked data to a preassigned row display portion associated with a display of an item designation to which the data corresponds, for each of plural such items in a common display of such plural items and corresponding, manually input data.

The above and further objects of the invention will become obvious from the description according to the accompanying drawings.

To accomplish those objects, the monitor display control method and apparatus for a data input unit of the invention is composed of and based upon devices and functions as follows. The data input unit has a manual input device for manual input of data, and has a monitor display unit by which the data which have been input by the manual input device concerned are represented on a screen. Input data initially is displayed in prearranged common display area of the screen of the monitor display unit, and an operator confirms the accuracy of the displayed data and then presses an item select key so that the data represented on the common display area is transferred to and displayed on the position of the screen where the corresponding item is displayed.

BRIEF DESCRIPTION OF THE DRAWINGS

FIGS. 4a to 4d are illustrations of items and data displayed on a display screen in accordance with another embodiment of the monitor display control method and apparatus of the invention.

FIG. 7 is a detailed block diagram of certain portions of the block diagram FIG. 6.

DETAILED DESCRIPTION OF THE INVENTION

The following description is concerned with an operator console embodying the invention for banking service. However, the invention is not limited to use as an operator console, and other embodiments of the invention, e.g., an inquiry unit and a subscription unit, are possible.

Figure 1:
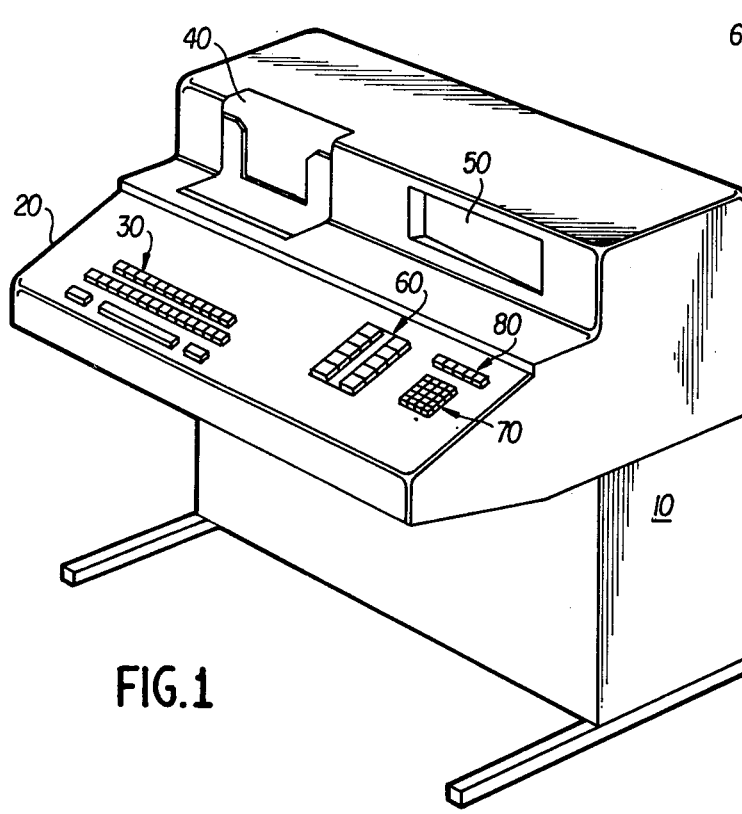
FIG. 1 is an external appearance view showing an operator console embodying the present invention for banking service.

Referring now to the drawings, FIG. 1 is a perspective view of the external appearance of an operator console for banking service in accordance with an illustrative, first embodiment of the invention, and which consists of a front inserter 40 into which a customer's pass-book or the like is inserted, a monitor display unit 50 which performs monitor display of manually input data, and a keyboard console 20 which includes alphanumeric keys 30, transaction item select keys 60, transaction data input keys 70, and transaction type assignment, or select, keys 80. The alphanumeric keys 30 and ten keys 70 are used to input customer's transaction data manually. The transaction type assignment keys 80 are used to designate the kind of customer's transaction, e.g., "deposit" or "withdrawal". The transaction item select keys 60 are used to select transaction items, e.g., account number, transaction date, and amount of transactions. Each of the transaction items concerned corresponds to the transaction data which is manually input by pressing the alphanumeric keys 30 and the data keys 70.

Figure 2:
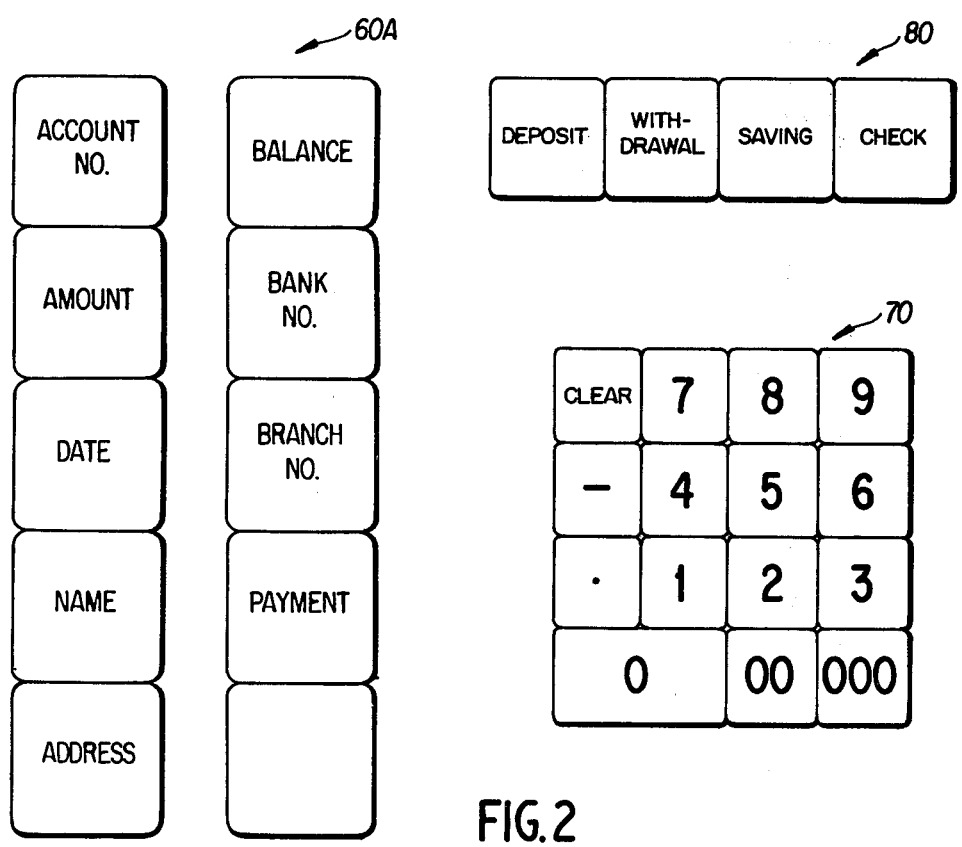
FIG. 2 is a plan view of a key arrangement of the operator console shown in FIG. 1.

FIG. 2 is an enlarged view of transaction item select keys 60 corresponding to keys 60 of FIG. 1, ten keys 70, and transaction type assignment keys 80 which are shown in FIG. 1. The transaction item select keys 60A consist of an "ACCOUNT NO." key used to indicate customer's account number, an "AMOUNT" key to show amount of customer's transactions, a "DATE" key to display transaction data, a "NAME" key to represent customer's name, an "ADDRESS" key to express customer's address, a "BALANCE" key to indicate customer's balance, a "BANK NO." key to show the number of customer's correspondent bank, a "BRANCH NO." key to display the branch number of customer's correspondent bank, a "PAYMENT" key to represent companies or persons to which the customer is making a payment, and an auxiliary key with no mark. The transaction type assignment keys 80 are composed of four keys "DEPOSIT", "WITHDRAWAL", "SAVING", and "CHECK". The data keys 70 comprise keys "0" to "9", keys "00" and "000", a "." key used to show a decimal point, a special symbol "-", and a "CLEAR" key.

FIG. 3 is a drawing which explains the operation of the first embodiment of the invention, and which shows a screen of the monitor display unit 50. The screen is divided into three sections: transaction item display area 50A, transaction item data display area 50B, and common display area 50C for temporary display and monitoring of input data. When an operator presses one key out of the transaction type assignment keys 80, the transaction item corresponding to the pressed key is represented on the transaction item display area 50A of the screen of the monitor display unit 50. For example, pressing an transaction type assignment key "DEPOSIT" allows the transaction items "ACCOUNT NUMBER", "DATE", "AMOUNT", "BANK NUMBER", and "BRANCH NUMBER" to be shown on the transaction item display area of the screen.

Next, for instance, operator's work of manual input of customer's account number by the use of data keys 70 is performed as follows. Input of the account number '123456' by pressing the data keys 70 permits the account number '123456' to be represented on the common display area 50c which is placed at the lowest rows of the display screen as shown in FIG. 3 (a). The operator checks that the input has been correctly accomplished. In case of incorrect input, the operator presses a "CLEAR" key out of the data keys 70 shown in FIG. 2 in order to cancel the incorrectly inputted data, and the account number is keyed in again. When the input of the data is correct, the next operation is to make the input data correspond to one of the transaction items. With operator's pressing of the "ACCOUNT NO." key out of the transaction item select keys 60, the number "123456" represented on the common display area 50c is transferred and displayed on the column "ACCOUNT NUMBER" of the transaction item data display area 50B. Similarly, manual input of the transaction date "1974-1-1" by the use of the data keys 70 displays the representation "1974-1-1" on the aforesaid common display area 50c, and operator's pressing of the "DATE" key allows the representation "1974-1-1" to be transferred and displayed on the column "DATE" of the transaction item data display area 50B as shown in FIG. 3 (d).

Similar display control is performed in the case of manual input of respective data corresponding to the items "AMOUNT", "BANK NUMBER", and "BRANCH NUMBER". Thus the monitor display control system for a data input unit of the invention always provides the representation of the manually input data on the predetermined common display area; therefore, even where there are several types of input data, the check of the input data concerned is easy and certain since the transaction item select keys provide not only the correspondence of the manually input data with the transaction items but also the transfer and display of the manually input data in alignment with the positions where the names of the corresponding transaction items are displayed.

FIG. 4 is a drawing which explains another embodiment of the invention, and which shows a screen of a monitor display unit.

Figure 5:
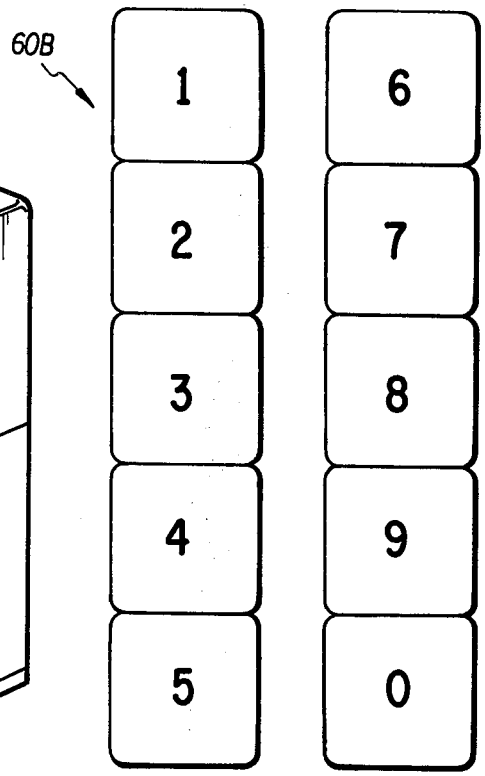
FIG. 5 is a plan view of an item select key arrangement in accordance with the embodiment of the invention producing the display as shown in FIG. 4.

FIG. 5 is an item select key arrangement view of the embodiment shown in FIG. 4.

Numeric characters "1" to "9" and "0" instead of the names of the transaction items for the keys 60A as shown in FIG. 2, are marked on respective top surfaces of the transaction item select keys 60B of FIG. 5. As shown in FIG. 4, not only the means of transaction items but also the key numbers of the respective keys 60B used to indicate the transaction items and the number of digits of the manually input data corresponding to the transaction items are represented on the transaction item display area 50A of the screen of the monitor display unit. For example, not only the name of transaction item "ACCOUNT NUMBER" but also the key number "1" out of the transaction item select keys which indicates the item "ACCOUNT NUMBER" and the digit number "6" of manually input data corresponding to the item "ACCOUNT NUMBER" are shown. Similarly, not only the name of transaction item "DATE" but also the key number "3" corresponding to this item and the digit number "10" of this item are displayed; not only the name of transaction item "AMOUNT" but also the key number "2" corresponding to this item and the number "5" of digits of this item are represented; not only the name of transaction item "BANK NUMBER" but also the key number "7" corresponding to this item and the number "2" of digits of this item are indicated; not only the name of transaction item "BRANCH NUMBER" but also the key number "8" corresponding to this item and the number "2" of digits of this item are shown.

These cases are roughly the same as the case of FIG. 3 in operator's work. Inputting the account number "123456" by the use of data keys 70 allows the input data to be represented on the common display area 50c which is placed at the lowest row of the display screen as shown in FIG. 4(a).

Next, with operator's pressing of a transaction item select key of the number is corresponding to the item "ACCOUNT NUMBER", the manually input data "123456" are transferred and displayed on the row "ACCOUNT NUMBER" of the transaction item data display area 50B. The operation for other items, e.g., "DATE", can be performed in similar procedure.

Figure 6:
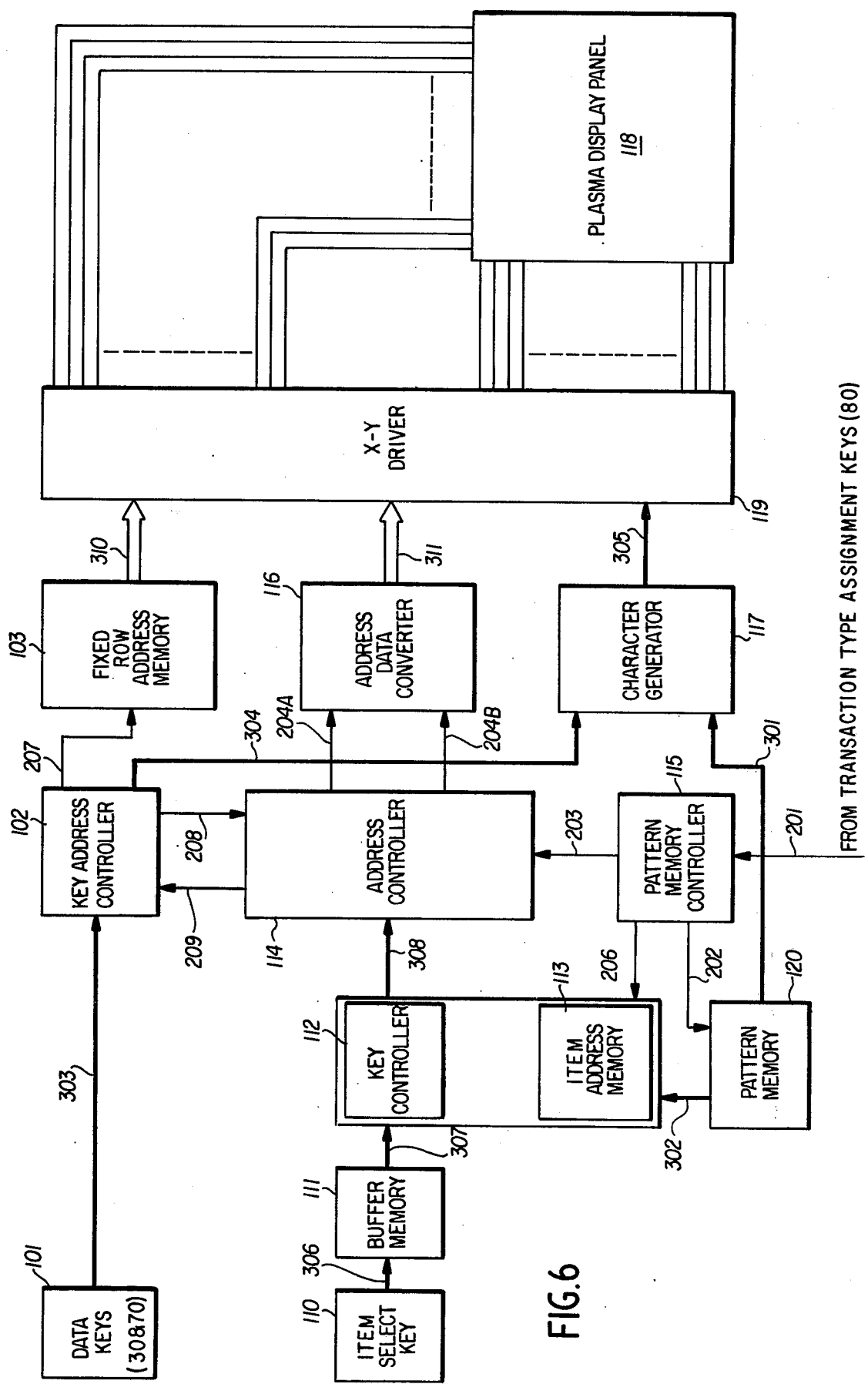
FIG. 6 is a block diagram of an embodiment of the invention for which displays shown in FIG. 3 and 4.

FIG. 6 is a block diagram of an embodiment of the invention shown in FIGS. 3 and 4. An element 101 represents the data keys, including the alphanumeric keys 30 and the transaction data keys shown in FIG. 1, and contains an encoder to encode the data by the keys selected. An element 102 is a key address controller which includes a buffer memory to store the input data from the data keys 101. An element 103 is a fixed row address memory, and an element 110 represents the item select keys 60 shown in FIGS. 1 and 2, and has an encoder to encode the data input for the keys selected. An element 111 is a buffer memory, an element 122 is a key controller, an element 113 is an item address memory, and element 114 is an address controller, an element 115 is a pattern memory controller, an element 116 is an address data controller, an element 117 is a character generator, an element 118 is a plasma display panel, an element 119 is an X-Y driver, and an element 120 is a pattern memory.

The operation of the embodiment of the invention shown in FIG. 6 will be now explained. The selection and designation of one transaction type by pressing one of the transaction type assignment keys 80 which are shown in FIGS. 1 and 2 makes the memory controller 115 start, through a line 201. The pattern memory 120 stores a set of transaction item signals and their respective display rows in area 50A, corresponding to each transaction type.

Figure 3B:
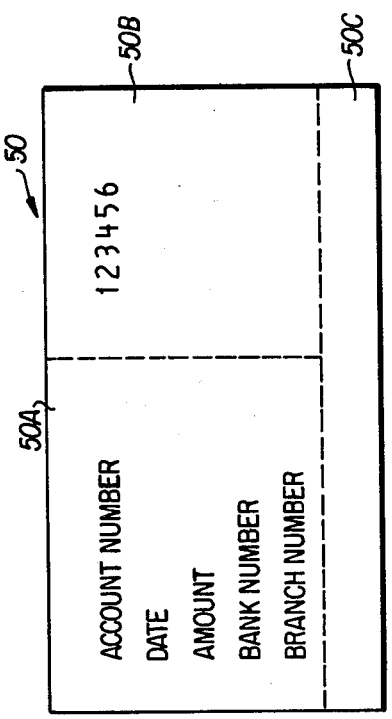
FIGS. 3a to 3d are illustrations of items and data displayed on a display screen in accordance with a first embodiment of the monitor display control method and apparatus of the invention.
Figure 3D:
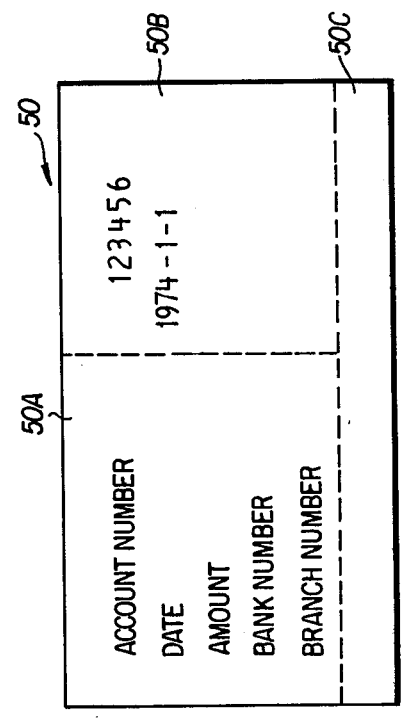
Figure 3A:
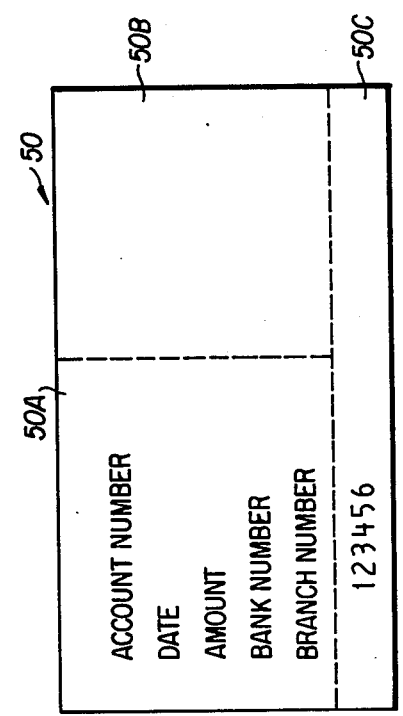
Figure 3C:
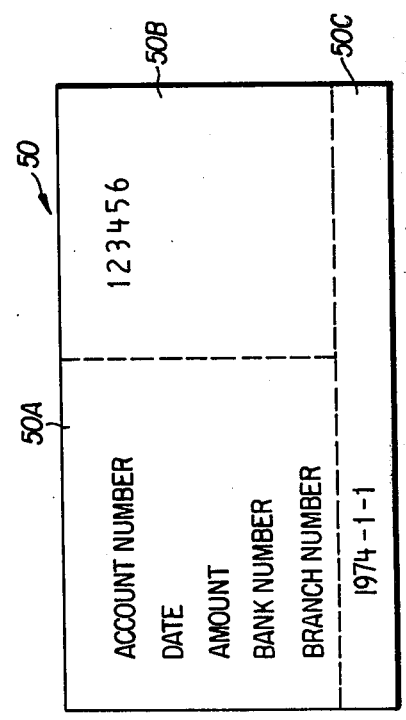

For example, for the selected transaction type is "DEPOSIT", and as shown in FIG. 3a), the pattern memory 120 stores a transaction code and a character code to assign to, and to display in, the first display row "ACCOUNT NUMBER", a transaction code and a character code for the second row "DATE", a transaction code and a character code for the third column "ACCOUNT", a transaction code and a character code for the fourth row "BANK NUMBER", and a transaction code and a character code for the fifth row "BRANCH NUMBER". As a result, with the transaction type selection by the use of the type select keys 80, the pattern memory controller 115 provides the memory address of the designated transaction type to the pattern mempory 120 through a line 202.

The character codes of the transaction items from the pattern memory 120 are sent to the character generator 117 through a line 301. The character generator 117 converts the character codes into display patterns, and sends the display patterns to the X-Y driver 119 through a date line 305. At the same time, the pattern memory controller 115 sends an address generating command to the address data controller 114 through a line 203. The address controller 114 generates and sends the signals of the display row X and display column Y and lines 204 A and B to the address data converter 116. The address data converter 116 converts the signals of the display row and column into the address of the display row and column, and sends the address to the X-Y driver 119 through a data line 311. The X-Y driver receives the aforesaid display pattern and display address, and allows the plasma display penel 118 to accomplish the display as shown in FIG. 3(a). In this case, the display signal X is used to define the position along a given row, i.e., the column, position intersecting the row where that row is defined by the Y signal, for the above-mentioned transaction item display area 50A.

The pattern memory controller 115 gives a command to the item address memory 113 through a line 206 that the term address memory 113 should receive through line 302 and store the aforesaid stored data from the pattern memory 120. As a result, the item address memory 113 stores both aforementioned display row signal and the transaction item code corresponding to the signal. Next, an operator checks the item displayed by the above-mentioned operation as shown in FIG. 3(a), and performes the manual input of data by pressing the appropriate data keys 101. The buffer memory in the key address controller 102 stores the manually input data from the depressed key 101 through a line 303, and the key address controller 102 sends the manually input data concerned to the character generator 117 through a data line 304. The character generator 117 converts the manually inputted data into display pattern and sends the display pattern to the X-Y driver 119 through a data line 305. At the same time, the key address controller 102 actuates the fixed row address (i.e., fixed Y address) memory 103 through a line 207 so that the row address which is predetermined as the common display area 50c (for instance, the lowest row address in the case of FIG. 3(a)) may be sent to the X-Y driver 119 through a line 310, and the key address controller 102 actuates the address controller 114 through a line 208 so that the row address positions along the row (i.e., the X value along the X axis for the given row) may be successively sent to the address data converter 116 through a line 204A. Therefore, the manually input data is displayed on the common display area 50C occupying the lowest row of the screen.

Next, an operator confirms the content of the manually input data, and presses one of the item select keys 110 which corresponds to the item selected and for which data was entered manually, so that the encoded item data corresponding to the selected item may be sent to the buffer memory 111 through a data line 306. The item data from the buffer memory 111 is sent to the key controller 112 through a data line 307. The key controller 112 reads the display row address i.e., the Y address defining a given row, which corresponds to the item data stored in the item address memory 113, and the key controller 112 finds the row on which the item data is represented, and sends the display row address and the item code to the address controller 114 through a data line 308. The address controller 114 receives the information, and gives a display transfer instruction to the key address controller 102 through a line 209. By this display transfer instruction, the key address controller 112 actuates the fixed row address memory 103 through a line 207 in order to clear the display in the lowest row display area 50C.

Next, by the key address controller 102, the manually input data stored in the buffer memory afforded by the data register 102B of the key address controller 102 is sent to the character generator 117 through a data line 304. The aforementioned display row address sent from the key controller 112 is given to the address data converter 116 through the address controller 114 and a line 204B. The column signals i.e., the successive X addresses along that row, for the aforesaid transaction item data display area 50B are successively sent from the address controller 114 to the address data converter 116 through a line 204A. As a result, the above-mentioned manually input data is displayed in the transaction item data display area 50B, row alignment with the item being selected by an item select key, with successive characters (e.g., digits), in successive columns, or X addresses, positions of each such row.

FIG. 7 is a detailed block diagram of the key address controller 102 and the address controller 114 which are shown in FIG. 6.

The key address controller 102 consists of a receiving buffer 102A, a data register 102B, a read/write controller 102c, OR-gates 102D and 102F, and a delay circuit 102E; while the address controller 114 is composed of a receiving buffer 114A and 114I, a delay circuit 114B, gates 114C and 114J, X-address controllers 114D and 114E OR-gates 114F and 114H, and a Y-address controller 114G. The X-address controller 114D sends the aforesaid X address signals successively i.e., successive X value signals along a given row (Y), which are to be represented on the transaction item display area 50A of the screen, and this operation is performed in the order of the position in the display of, the row X signals in the transaction item display area 50A concerned, that is, the leftmost row X signal for a given row (Y) is sent first. The X-address controller 114E sends the above-mentioned row X signals successively which are to be shown on the transaction item data display area 50B of the screen, and the operation is accomplished in the order of the position in the display of the row X signals in the transaction item data display area 50B concerned, that is, the leftmost row X signal for a given row (Y) is sent first. For example, the X-address controller 114D sends the row X signal "1" first, and the X-address controller 114E sends the row X signal "20" firstly. The manually input data is sent to the buffer memory 102A of the key address controller 102 through a data line 303, and is temporarily stored in the buffer memory 102A. The flow of this data is divided into two directions: one is sent to the gate 102D and through it to the line 304, the other is given to the data register 102B. The following operation is controlled by the read/write controller 102C. Namely, the buffer memory 102A receives the manually input data, and provides a data detecting signal to the read/write controller 102C through a line 210. By this data detecting signal the read/write controller 102c actuates the above-mentioned fixed row (Y) address memory 103 through a line 208A, the gate 102F, and a line 207. At the same time, the read/write controller 102c starts the X-address controller 114D of the address controller 114 through a line 208A. As a result, when the buffer memory 102A performs the receiving of one character and the sending of the input data to the data line 304, the fixed row assignment instruction is synchronously sent through the line 207, and a column signal is also synchronously given through the X-address controller 114D, the OR-gate 114F, and a line 204A in the order of the column position (for example, the signal which is firstly sent is "1").

Next, the transaction item row signal is sent to the buffer memory 114A through a data line 308A, and the transaction item code is given to the buffer memory 114I, in response to receipt of the transaction item row signal, through a data line 308B. The buffer memory 114A sends a display transfer instruction through the lines 209 and 209B, gate 102F, and line 207 in order to start the fixed row address memory 103 again i.e., to cause the memory 103 to supply as its output the lowest row address. In this case, since no data is transferred to the character generator 117, the indication of assigned rows disappears. By the delay circuit 102E and 114B which have the delay time corresponding to the disappearance time, the receiving signal from the buffer memory 114A is delayed and sent to the read/write controller 102c and the gate 114c.

A signal is sent from the delay circuit 102E to the read/write controller 102c through a line 209A, and the read/write controller 102c operates and sends the signal to the data register 102B, and the manually input data stored in the data register 102B is given through the gate 102D to the line 304. At the same time, the other flow of the output data from the data register 102B is sent to the storage device in order to be stored. The read/write controller 102c sends a display column signal to the X-address controller 114E through a line 208B, and the X-address controller 114E is actuated and gives the signal to the line 204A through the gate 114F in synchronization with the manually input data as read out from register 102B, in the order of the signal position (for instance, the X address signal which is first sent is "20").

The output from the delay circuit 114B is sent to the gate 114C through the line 212 in order to open the gate 114C, and the item row signal (i.e., the Y address) in the buffer memory 114A is given to the line 204B through the gate 114C and the gate 114H.

As a result, the manually input data stored in the data register 102B is transferred from the aforesaid common display area to the row (i.e., Y address) of data display portion 50B where the corresponding item is represented, and simultaneously the transaction item code in the buffer memory 114 I is sent to the storage device through the gate 114J in order to be stored. The pattern memory controller 115 sends a signal to the X-address controller 114D and the Y-address controller 114G through the line 203, and the X-address controller 114D and Y-address controller 114G are started and send corresponding X-signal and Y-signal to the address data converter 116 when item read is performed by the pattern memory controller 115. Y address controller 114G sends successive row signals for designating the display row to the address data converter 116, in synchronism with the transmission of the respective transaction item signals from pattern memory 210 through line 301 to the character generator 117.

Next, the operation in the case of FIGS. 4 and 5 will be explained with reference to aforesaid FIG. 6.

The pattern memory 120 not only stores the above-mentioned signals which indicate a transaction item code, a character code of the transaction item, and a display row of the transaction item but also stores the following signals: a signal which shows the key number corresponding to the transaction item, and a signal to give the number of digits of the transaction item to be input. Out of such signals, the signal which indicates a character code of the transaction item, the signal which shows the key number, and the signal which gives the number of manual input digits are sent to the character generator 117 through the line 301 in order to be displayed as shown in FIG. 4 (a). And, the other current flow of signals representing the transaction item code, key number, and display row of the transaction item is sent from the pattern memory 120 to the item address memory 113.

The item select key 110 outputs and sends a key number to the buffer memory 111. The key number is stored in the buffer memory 111, and is supplied to the key controller 112 in order to read out the item display row and a corresponding transaction item code from the item address memory 113. The item display row and the transaction item code are sent to the address controller 114 through the data lines 308A and 308B. The next operation is the same above-mentioned one. Since the operation and the detailed block diagram of the X-Y driver 119 and the plasma display panel 118 are shown in the U.S. application Ser. No. 317,643 which was filed in Dec. 22, 1972 by the applicant, now U.S. Pat. No. 3,979,718 this specification does not explain the X-Y driver 119 and the plasma display panel 118 concerned in detail.

As described above, the system emboding the present invention allows the manually input data to be represented on the common display area and then to be transferred to the position which corresponds to each item; therefore, the operator's check and the prevention of an erroneous operation are accomplished easily.

While the invention has been described by means of specific examples and in specific embodiments, we do not wish to be limited thereto, for obvious modifications will occur to those skilled in the art without departing from the spirit and scope of the invention.

What is claimed is:

1. A monitor display control method for displaying data of various types in predetermined respective addressable positions of a display unit, comprising the steps of:
   (a) providing a display unit having plural addressable positions, each position having a first and second portion, said display unit further having a common portion for displaying data input to said unit;
   (b) receiving and displaying, in said common portion, data manually input to said unit by an operator;
   (c) displaying, in said first portion, a plurality of item designations corresponding to various types of said data manually input;
   (d) designating, based on operator input and in accordance with said plurality of item designations displayed in the first portion, the type of data in said common portion; and
   (e) addressably transferring said input data from said common portion to the second portion of that respective addressable position corresponding to said type of data designated in step (d).

2. A monitor display control method as set forth in claim 1, further including:
   assigning an additional code corresponding to the number of digits for each type of data; and
   displaying the said number of digits in association with each item designation as displayed in said first portion of said display unit.

3. A control system for controlling the display of various different types of items of data input to a display apparatus in response to an operator input, said display apparatus comprising:
   data input means for manually entering data corresponding to said various different types of items, and
   display means for displaying said corresponding to said various different types of items and having a plurality of addressable display positions, one for each different type of item, each respective display position having a first portion for displaying item designations defining the respective type of item displayed at said respective display position, and a second portion for displaying said data input corresponding to said respective type of item displayed at said respective display position, said display means including a common portion connected to said data input means and responsive thereto for displaying said data corresponding to said various types of items;
   said control system comprising:
   supplying means for supplying said item designations to said display means, said display means being responsive thereto for displaying said item designations in said first portion of corresponding said addressable display portions.
   designating means responsive to said operator input for designating a given one of said types of items as identifying data displayed in said common portion of said display means, and
   transferring means responsive to said designating means for addressably transferring said data displayed in said common portion to said second portion of said respective display position corresponding to said designated given one of said types of items, and for clearing said common portion.

4. A control system as recited in claim 3, wherein said item designations are grouped into a plurality of sets of item designations, and wherein:
   said item designation supplying means includes means for storing said plurality of sets of item designations, and for storing a character code for each said item designation and an address position code one for each said each item designation, corresponding to a predetermined display position of said display means in the first portion of which said each item designation is to be displayed, and wherein there is further provided:
   selecting means responsive to said operator input for selecting a given one of said sets of item designations, and
   means responsive to said set selecting means for actuating said item designation supplying means to supply the character code and address position code for each item designation of the selected given one of said sets.

5. A control system as recited in claim 4 wherein said common portion has a plurality of character positions and said display means comprises:
   means for storing addresses of said positions in said common portion of said display means, and
   address controller means responsive to entry of data via said data input means to actuate said common portion address storing means for successively addressing the positions of said common portion for display therein of successive characters of the manually entered data.

6. A control system as recited in claim 5 wherein there is further provided a character generator for generating a sequence of characters corresponding to the input data in synchronism with the addressing of successive positions of said common portion by said addressing means.

7. A control system as recited in claim 5 wherein there is further provided:
   a character generator for generating a display pattern for data to be displayed, and
   addressing means for generating addresses of display positions for data in said display means, and responsive to said selected given one of said sets of items as selected by said selecting means for generating respective addresses of display positions in said first and second portions of said display means in association with each respective item in said selected given one of said sets of items,
   said controller means further being responsive to selection of said selected given one of said sets of items for supplying the data from said input means to said character generator in synchronism with the generation of addresses by said address controller means, whereby to produce the display of the data at the respective addresses of said second portion of said display means associated with the corresponding item displayed in said first portion of said display means.

8. A control system as recited in claim 4 wherein there is further provided:
   a character generator for generating a display pattern for data to be displayed, and
   addressing means for generating addresses of display positions for data in said display means and responsive to said selected given one of said sets of items as selected by said selecting means for generating respective addresses of display positions in said first and second portions of said display means in association with each respective item in said selected given one of said sets of items.

9. A control system as recited in claim 2 wherein said common portion has a plurality of character positions and said display means comprises:
   means for storing addresses of said positions in said common portion of said display means, and
   address controller means responsive to entry of data via said data input means to actuate said common portion address storing means for successively addressing the positions of said common portion for display therein of successive characters of the manually entered data.

10. A data input control system having a monitor display unit, comprising:
    display means having addressable display positions and providing a first display portion for display of plural item designations in predetermined positions thereof, a second display portion for selective display of input data in positions of said second display portion associated with respective corresponding ones of said predetermined item designation display positions of said first display portion, and a common display area;
    means for supplying a plurality of item type designations for display by said display means in respective, predetermined positions of said first portion of said display means;
    data input means for manually entering data of corresponding respective item types;
    means responsive to entry of data by said data input means to produce a display of said data in said common display area;
    means responsive to operator selection of a given respective item type corresponding to the type of manually entered data for designating, in said first display portion, a given one of said plural item designations corresponding to the respective item type, whereby to designate said data displayed in said common display area as being of a given item type; and
    means responsive to said designation of said given one of said plural item designations for transferably displaying the manually entered data in that position of said second portion of said display means associated with said designated item type, and for clearing the data from said common display area.

* * * * *

UNITED STATES PATENT AND TRADEMARK OFFICE
CERTIFICATE OF CORRECTION

PATENT NO. : 4,141,001

DATED : February 20, 1979

INVENTOR(S) : Koichi Suzuki et al

It is certified that error appears in the above-identified patent and that said Letters Patent are hereby corrected as shown below:

```
Column 1, line 37, after "input" insert --data--.
Column 2, line 68, after "displays" insert --are--.
Column 3, line 22, "or" should be --on--.
Column 3, line 40, "data" should be --date--.
Column 5, line 66, "mempory" should be --memory--.
Column 6, line 4, "patterm" should be --pattern--.
Column 6, line 30, "performes" should be --performs--.
```

Signed and Sealed this

Nineteenth Day of June 1979

[SEAL]

Attest:

RUTH C. MASON
Attesting Officer

DONALD W. BANNER
Commissioner of Patents and Trademarks